June 24, 1958 R. T. HANGER 2,839,953
DRILL MOTOR COLLET MOUNTS
Filed Oct. 24, 1955 2 Sheets-Sheet 1

INVENTOR.
RANDOLPH T. HANGER
BY
Reynolds, Beach + Christensen
ATTORNEYS

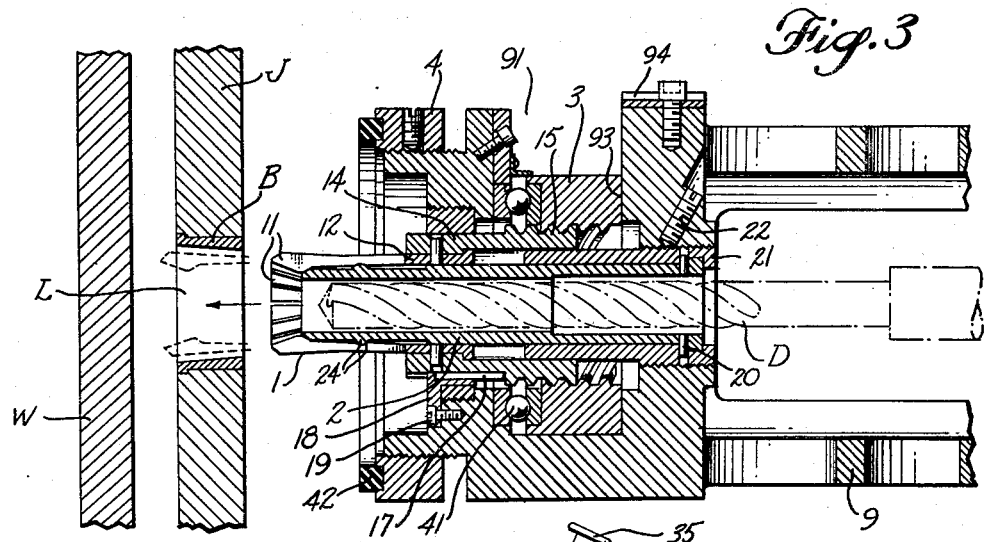
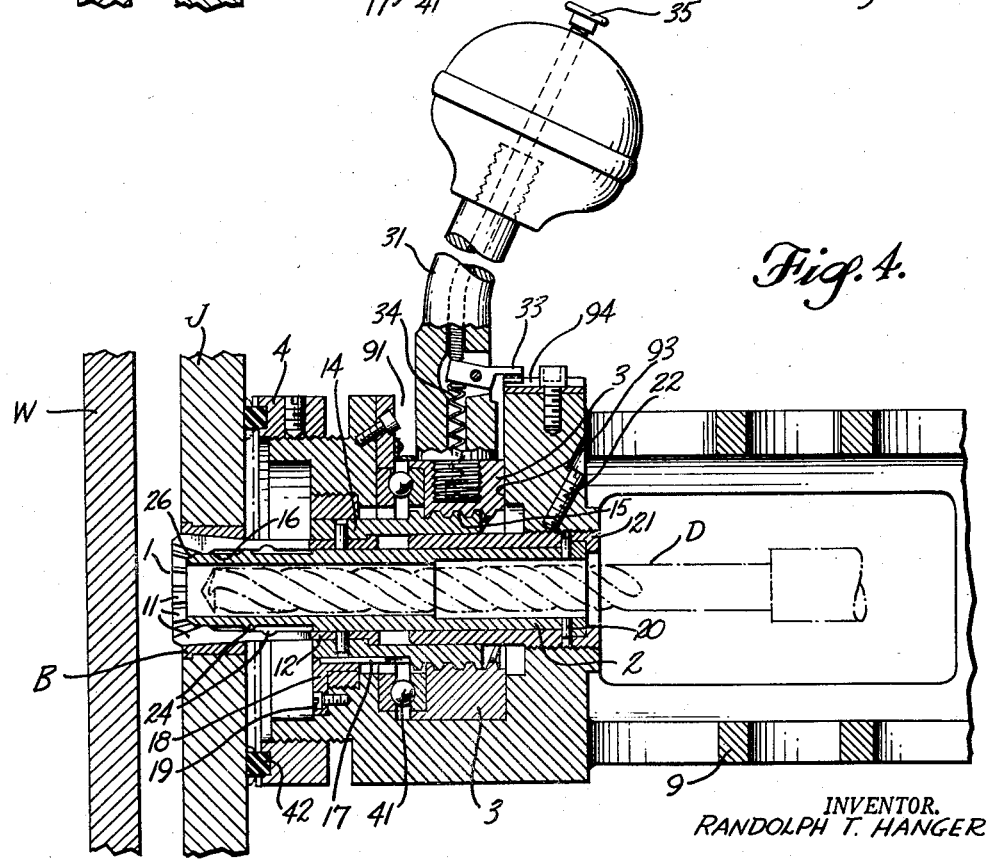

United States Patent Office 2,839,953
Patented June 24, 1958

2,839,953

DRILL MOTOR COLLET MOUNTS

Randolph T. Hanger, Seattle, Wash., assignor to Boeing Airplane Company, Seattle, Wash., a corporation of Delaware Application October 24, 1955, Serial No. 542,202

11 Claims. (Cl. 77—13)

In work such as aircraft construction, motor-driven drills are used to bore holes in a work piece. Often such holes must be driven with considerable accuracy as to location and alignment, and it is frequently necessary to employ a jig fixedly located with respect to the work piece, and having locating holes for the securement and support of the motor-driven drill in proper position and alignment, yet still it is desirable to employ the same drill, without the necessity of recourse to a special tool. An example of such tools and their support is found in the patents to Taylor, No. 2,541,306, dated February 13, 1951, and No. 2,488,992, dated November 22, 1949.

The Taylor patents disclose a drilling tool which is capable of being supported upon a jig, in fixed alignment with a locating hole, while a motor-driven drill bit drills the work piece, but the Taylor tool is objectionable in that it is a special purpose tool, not adapted for most drilling operations, but only in conjunction with such a jig. It is further objectionable in that, being heavy and intended for support wholly by means of complemental two-part couplings, of which one part is carried at the tip of the tool body and the other part is fixed in the locating hole, the couplings must be long enough to afford reasonable assurance of support for the cantilevered weight, in correct alignment. The jig-mounted coupling part or bushing is necessarily of such length that it projects materially from its locating hole in the jig. The heavy weight of the tool, otherwise unsupported, and its vibration, soon create inaccuracies in alignment. Moreover, the projection of the bushings from the jig, necessary as it is to afford proper support and alignment, leave them where they are not infrequently struck accidentally, and so the bushing is moved from alignment, or is loosened. The interengaging surfaces of the bushing and of the motor-supporting frame must fit very accurately, yet they are subject to wear because of the large forces applied to the small surfaces. The projecting bushings are a source of possible injury to workmen and of damage to the workman's clothing. It has been found in practice that such projecting fittings have been the source of much damage, misalignment, annoyance, etc.

The tool of the present invention is designed for use with an ordinary motor-driven drill, for attachment thereto and detachment therefrom. The drill, therefore, can be used as an ordinary portable drill, hand held and directed, or by the securement to it of a small frame the same drill can be supported upon a jig with great accuracy. All parts necessary for the support and alignment of the drill are mounted in the separate frame; in small compass, and only this small and relatively inexpensive separate assembly need be supplied to enable the ordinary drill to accomplish extremely accurate, jig-guided work, in addition to its normal work. In addition, the manner of support of the tool and its attached frame upon the jig is such that no projecting bushings are required in the jig, and no accurately interfitting surfaces of complemental coupling parts are required, yet the tool can be held accurately, and over a longer useful life, than with the mount of the prior type. The elimination of projecting bushings avoids accidental misalignment thereof, and injuries to workmen and damage to their clothing.

More specifically, it is an object to accomplish the support of such a drill motor from a jig by means of an expansible and contractible collet, mounted in a separate frame attached immovably to the drill motor, together with means for expanding and so fixing the collet within the locating hole, or conversely for contracting it for movement into and from the hole. Moreover, it is a further object to provide convenient means for accomplishing this expansion and contraction of the collet, and for holding the same in any given position against the possibility of accidental contraction. The weight of the tool is braced from the jig, outwardly of the locating hole, relieving the bushing therein of a large part of the misaligning stress previously applicable thereto.

To accomplish the latter end there is provided an index ring of relatively large diameter, carried by the motor-supporting frame, and engageable with the face of the jig, of such nature and so connected to the collet-expanding mechanism, that the index ring will be forced full-face against the jig to accomplish substantially automatically correct alignment of the drill's axis during the process of expanding the collet within the locating hole, and will constitute a brace which relieves the collet and its hole from the moments which, in previous devices, deformed the interengaged coupling parts.

With such objects in mind, and others as will appear more fully hereinafter, the present invention comprises the novel drill motor-supporting means, shown in a typical form in the accompanying drawings, and the principles whereof will be more fully explained hereinafter and defined by the claims.

Figure 3 is an axial sectional view of the supporting means in position ready to enter a locating hole of a jig, and Figure 4 is a similar view with the supporting means not quite fully secured in operative position.

Figure 1:
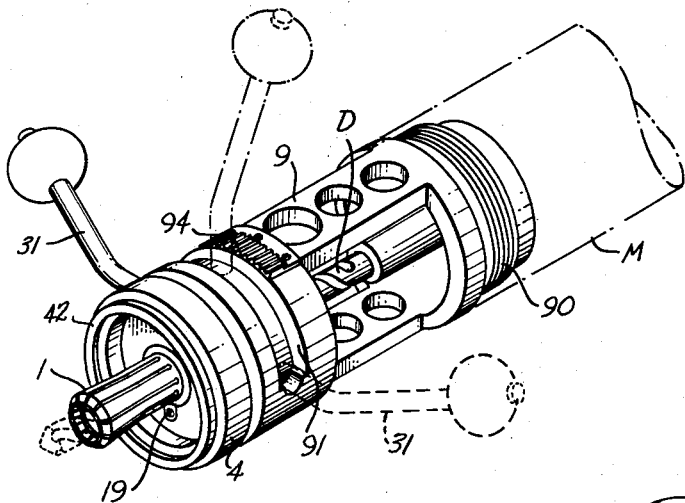
Figure 1 is an isometric view of the supporting means in association with the drill, but with the motor frame only indicated in dot-dash lines, and showing by dot-dash lines, by dash lines, and in full lines, respectively, three different positions of the operating handle.
Figure 2:
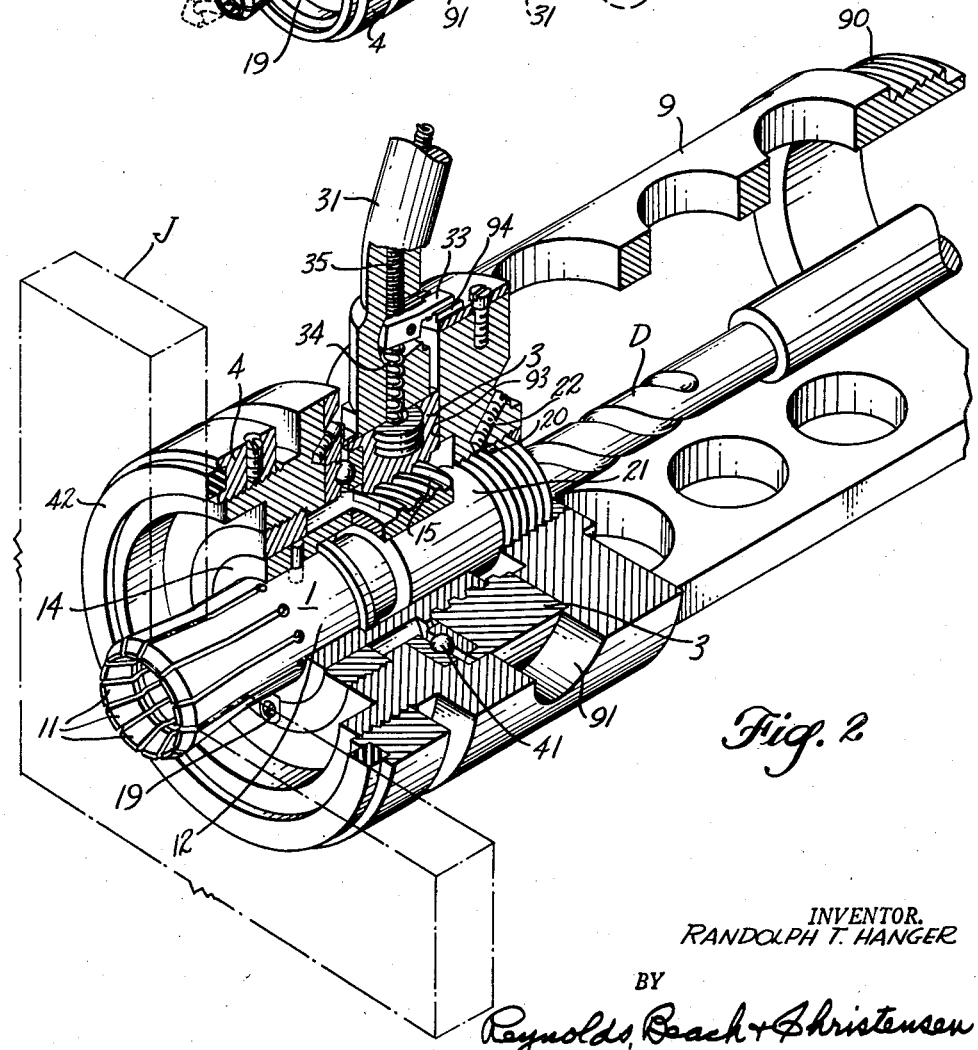
Figure 2 is a view to an enlarged scale, similar to Figure 1, but with parts broken away and shown in section or in phantom, and illustrating a different position of the operating handle.

Since the general plan of the mechanism is well illustrated in the Taylor patents mentioned above, and since the present invention is concerned only with the supporting means, it will not be necessary in this application to illustrate or describe the drill motor, drill, drill-advancing or retracting means, etc. A drill motor casing or tool body is indicated at M in Figure 1, and the drill rotated thereby is indicated at D. The jig is indicated at J with a locating hole L supported in accurate position with respect to a work piece W. The locating hole L may desirably mount a reversely tapered bushing B, not only because the reverse taper is of advantage in the securement of the supporting means in place, but also as a means to minimize the effects of wear, for the bushing B may be of harder material than the jig. The manner in which the bushing is secured in place in the locating hole L is immaterial. It is intended to be mounted permanently in place therein, and in particular it will be noted that the bushing B does not project from either surface of the jig J.

A frame 9 of generally tubular shape is suitably formed and arranged at one end, as for example by the provision of threads 90, for its securement to the tool body M.

When secured together, the two are relatively immovable. The frame 9 may be provided with access openings and lightening holes as shown, but these are primarily for convenience, and need not be described in detail. At its end opposite the securing means 90, the tubular frame 9 is substantially continuous, although it is open at its end, and is provided with a circumferentially directed slot 91, which extends, in the form shown, through substantially 180°.

Supported from the frame 9 coaxially of the drill D and surrounding the latter, at least when the drill is retracted as at the commencement of a drilling operation, is a guide sleeve 2. This guide sleeve is fixed with relation to the frame 9, for example, by means of pins 20 by which it is secured to a threaded sleeve or bushing 21, which is threaded within the frame 9, and which may be held in place by a set screw 22. Interiorly, the guide sleeve is of a size to pass the drill D.

Guided upon the guide sleeve 2 for relative axial movement is an expansible and contractible collet, designated generally by the numeral 1. The separable resilient fingers 11 thereof are of a size externally to enter the locating hole L or its bushing B when the collet is contracted, but to grip the bore of the bushing when the collet fingers are expanded. The continuously circular portion 12 of the collet is pinned to a sleeve 14, which at its inner end is threaded, as indicated at 15; preferably the threads are of fairly high pitch, say of 7° slope, hence are inherently self-locking in a given position of adjustment. The collet 1 with its threaded sleeve 14 constitute, in effect, a single continuous sleeve, which is guided upon the guide sleeve 2 for relative axial movement. Provision is made for preventing rotational movement of this sub-assembly; for instance, a key projecting from a retainer 18 is received in a keyway 17 extending lengthwise of the sleeve 14. The retainer 18 is fixed to the frame 9 by a screw 19.

A nut 3 has internal threads complementally engaging the threads 15 of the sleeve 14, so that by rotation of the nut, the sleeve 14 being held against rotation, relative axial movement between the sleeve 14, and consequently the collet 1, on the one hand, and the nut 3 on the other hand, will be effected. Such rotational movement may be accomplished by any suitable means, such, for instance, as the handle 31, carried by the nut 3, and projecting more or less radially therefrom through the slot 91.

An index ring assembly 4 is supported from the frame, disposed coaxially of the collet and guide sleeve intermediate the jig J and the left-hand face of the nut 3. A thrust bearing 41 is interposed therebetween. Assuming the collet to be engaged within its bushing B, rotation of the nut 3 in one rotative sense urges the index ring 4 against the face of the jig and by reaction urges the collet 1 to the right. The collet and the guide sleeve 2, which is fixed with relation to the frame, are provided at their respective tips with cooperating cam surfaces 16 and 26, which, upon such relative axial movement of the collet and guide sleeve, cause expansion of the fingers 11 of the collet. This, of course, expands the collet in a manner to grip the interior of the locating hole L or of the reversely tapered bushing B, and in addition to tending to tighten or grip the collet within the locating hole, by reaction from the now-gripping collet, it tends also to draw the entire frame and the tool supported thereby toward the jig J. Preferably, a resiliently depressible contact ring 42 of a rubber-like material is interposed between the index ring 4 and the facing surface of the jig. When the frame is drawn to the left, this contact ring 42 is resiliently deformed, as shown in dot-dash lines in Figure 4, and this permits some shifting of the collet in order to align it axially within the hole or the bushing B. The large diameter index ring relieves the bushing B of any moment, and braces the entire tool from the circle of contact. Reverse rotation of the nut 3 causes it to bear at 93 against the frame, and so effects reverse axial movement of the guide sleeve 2 with respect to the collet 1, and effects or permits collapse of the collet. Interengageable locating elements 24 hold the two in a position corresponding to the collapsed position of the collet. In this collapsed position, shown in full lines and also in dash lines in Figure 3, the collet is readily inserted within or removed from a bushing B.

Since rotation of the nut 3 and its operating handle 31 serves to accomplish relative movement of the guide sleeve 2 and the collet 1, it is desirable to provide means for retaining the nut in any given position of rotative adjustment, at least, within a given range. This may be accomplished by the provision of a dog 33, on the handle 31, and an arcuate rack 94 on the frame 9, interengageable to the end indicated. A spring 34 and flexible wire release 35 serve to retain the detent in engagement with the rack, or to release the same, respectively.

When it is desired to locate the motor M and the drill D in operative position with respect to the work W, the collapsed tip of collet 1 is entered within the proper locating hole L, which usually will be provided with the reversely tapered bushing B, or otherwise will be itself reversely tapered. Parts are shown in full lines in Figure 3 in position for entrance into the bushing B, and in dash lines, the tip of the collet has been shown entered within the locating hole. With parts in the latter position, the nut 3 is rotated from a position such as the full line position of Figure 1 to the dot-dash line position of the latter figure, or into the full line position of Figure 4. This effects relative axial movement between the collet and the guide sleeve 2, and expands the tip of the collet into locating engagement with the bushing B. In order to effect this, the relative axial movement between the nut 3 and the threads 15 produce a reaction, bearing at 41 and so urging the index ring 4 against the jig J. The initial reaction of the jig urges the collet 1 to the left and the guide sleeve 2 correspondingly to the right, so that the collet is expanded into locating engagement within the locating hole and the bushing B. This position of parts is shown in Figure 4. Continuing the relative rotation of the nut and the threads 15, the same reaction continues, but now the resistance of the parts to appreciable leftward movement of the collet resiliently deforms the mount ring 42, and compresses the latter into a position somewhat as shown in dot-dash lines in Figure 4. This accomplishes any minor adjustment of the alignment of the collet within the bushing, and completes the locating of the frame and motor supported thereby, and effects secure support or bracing for the same. The motor is then energized, and by means not shown herein, but described in the Taylor patents, the drill is urged forwardly into and through the work piece, after which the drill is retracted, and by reverse rotation of the nut relative to the threads 15, the reaction now taking place between the nut and the face 93, the guide sleeve 2 is withdrawn within the collet 1, the cam elements 26 and 16 again re-engage in their relaxed position, and the collet fingers contract. The device may now be removed bodily from the jig, and is ready to re-engage immediately within the next locating hole.

I claim as my invention:

1. In combination with a portable drill or like tool which includes a tool body and a tool bit movable axially of the tool body, a jig having locating holes and capable of being exactly positioned with relation to a workpiece to be drilled, a frame means for securing said frame to the tool's body, an expansible collet supported and projecting from an end of said frame, surrounding and coaxial with the tool bit, and of a size when contracted to enter a locating hole of the jig, and means reacting between said collet and said frame for expanding the collet into coaxial engagement with the walls of such hole, when entered thereinto, to support and locate the frame, the tool body, and the tool bit, with relation to the jig and so with relation to the workpiece, and for contracting the collet for removal of the tool from the jig.

2. A device as in claim 1, wherein the collet-expanding means includes a threaded sleeve coaxial with and fixed to the collet, a nut threaded upon said sleeve and bearing axially against the frame, a guide sleeve fixed to the frame, coaxial with the collet, and means to rotate said nut to shift said threaded sleeve and collet axially relative to said guide sleeve, and complemental cam surfaces upon said guide sleeve and said collet positioned for interengagement to expand and to permit contraction of the collet upon their relative axial movement in respectively opposite senses.

3. The combination of claim 1, including additionally bracing means carried by the frame and positioned for engagement with the face of the jig radially outwardly of the locating hole wherein the collet is engaged, to brace the frame and the tool body secured thereto when the collet is so engaged.

4. In combination with a portable drill or like tool which includes a tool body and a tool bit movable axially of the body, a jig having locating holes and capable of being exactly positioned with relation to a workpiece to be drilled, a frame, means for securing said frame to the tool's body, and supporting the latter for relative movement of the tool bit in the axial direction, an expansible collet surrounding and coaxial with the tool bit, and supported and projecting from an end of said frame for axial movement, and said collet being of a size when contracted to enter a locating hole of the jig, means reacting between the collet and the frame for shifting the collet axially, an index ring fixedly mounted upon the frame coaxially of the collet, in position adjacent the face of the jig when the collet is entered into a locating hole, and means reacting between the collet and the frame, and operable by their relative axial movement, to expand the collet into engagement with the walls of such hole, and to draw the index ring into engagement with the face of the jig.

5. In combination with a portable drill or like tool which includes a tool body and a tool bit movable axially of said body, a jig having locating holes and capable of being exactly positioned with relation to a workpiece to be drilled, a frame, means for securing said frame to the tool's body, and supporting the latter for relative movement of the tool bit in the axial direction, an expansible collet surrounding and coaxial with the tool bit, and supported and projecting from an end of said frame for axial movement, and said collet being of a size when contracted to enter a locating hole of the jig, a threaded sleeve guided in the frame for axial movement, and fixed to said collet, a nut threaded upon said threaded sleeve and guided in the frame for rotary movement only, means to rotate said nut, thereby to shift said collet axially, and means reacting between the collet and the frame, and operable by their relative axial movement, to expand the collet into engagement with the walls of such a hole, for supporting engagement of the frame and tool with the jig.

6. Supporting means as in claim 5, including additionally an index ring fixed to the frame, whereby the collet is axially slidably mounted with respect to said index ring, said index ring being positioned to bear at its one face against the jig when the collet is received within the locating hole thereof, and shifts axially relative to the frame.

7. Supporting means as in claim 6, including a resiliently depressible mount ring carried by said index ring and bearing upon the jig.

8. The combination of claim 5, wherein the collet-expanding means comprises complemental cam means upon the collet and upon a member of the frame, interengageable by axial movement of the collet to expand the latter.

9. The combination of claim 5, wherein the collet-expanding means comprises a guide sleeve fixed to the frame and disposed within and guiding the collet, and complemental cam means formed upon the collet and upon said guide sleeve, interengageable by axial movement of the collet to expand the latter.

10. Means for supporting a motor-driven drill or like tool, which includes a tool body, removably upon a jig fixed with relation to a workpiece, and such as has locating holes, said supporting means comprising a frame separate from and arranged for securement immovably with respect to the tool body, a guide sleeve coaxial with the drill and fixed to the frame in projecting position surrounding the drill, an expansible collet slidably supported upon said guide sleeve, of a tip size to enter the locating hole when contracted and to grip the interior walls thereof when expanded, the collet and the guide sleeve having complemental cam surfaces cooperating to expand the collet by their relative movement in one axial sense, and vice versa, an externally threaded sleeve fixed to the collet and axially guided upon said guide sleeve, a nut threaded upon said threaded sleeve, an index ring mounted upon said frame and bearing at one face upon said nut, and positioned to bear at its opposite face upon the jig when the collet is entered within a locating hole, said nut bearing at its opposite face upon the frame, and means to rotate said nut for expansion and contraction of the collet, and for urging the index ring against the jig.

11. A coupling and supporting device for a tool body wherein a tool bit is guided and supported for feeding and retracting movements along the tool's axis, said device comprising a frame separate from and formed for securement to the tool body, surrounding the tool bit, a jig having locating holes and capable of being exactly positioned with relation to a workpiece, a bushing disposed substantially wholly within each such hole, coaxial therewith, an expansible collet supported by and projecting from said frame, surrounding the tool bit and coaxial with the same, and guided for axial sliding movement relative to the frame, said collet when retracted being of a size to enter a bushing in the jig, means reacting between the frame and said collet for effecting relative axial movement thereof, and means interengageable by such relative axial movement for expanding the collet into supporting engagement with the walls of such bushing, and coaxial therewith, and for contracting the collet for removal of the tool, and an index ring carried by the frame, spaced radially outwardly from the collet, in position to engage the face of the jig, as a brace, upon expansion and accompanying axial movement of the collet.

References Cited in the file of this patent

UNITED STATES PATENTS

| | | |
|---|---|---|
| 1,630,083 | Hinckley et al. | May 24, 1927 |
| 2,669,887 | Rees | Feb. 23, 1954 |
| 2,706,917 | Hill | Apr. 26, 1955 |